United States Patent
Halliop

Patent Number: 5,649,982
Date of Patent: Jul. 22, 1997

[54] PROCESS FOR MANUFACTURING SUPER CAPACITOR

[75] Inventor: Wojtek Halliop, Kingston, Canada

[73] Assignee: Yardney Technical Products, Inc., Pawcatuck, Conn.

[21] Appl. No.: 631,680

[22] Filed: Apr. 10, 1996

Related U.S. Application Data

[62] Division of Ser. No. 65,987, May 21, 1987, abandoned.

[51] Int. Cl.$^6$ .................................................. H01G 9/15
[52] U.S. Cl. ............................................. 29/25.03
[58] Field of Search .................... 29/25.03; 204/294; 429/42, 44; 361/502

[56] References Cited

U.S. PATENT DOCUMENTS

| | | | |
|---|---|---|---|
| 4,562,511 | 12/1985 | Nishino et al. | 361/324 |
| 4,597,028 | 6/1986 | Yoshida et al. | 361/305 |
| 4,626,964 | 12/1986 | Azuma et al. | 361/433 |
| 4,906,535 | 3/1990 | Hoge | 429/42 |
| 5,150,283 | 9/1992 | Yoshida et al. | 361/502 |

FOREIGN PATENT DOCUMENTS

| | | |
|---|---|---|
| 449145 | 10/1991 | European Pat. Off. |
| 02240908 | 9/1990 | Japan |
| 02240911 | 9/1990 | Japan |
| 05074657 | 3/1993 | Japan |
| 06061073 | 3/1994 | Japan |

*Primary Examiner*—John Niebling
*Assistant Examiner*—Thomas G. Bilodeau
*Attorney, Agent, or Firm*—Louis E. Marn

[57] ABSTRACT

There is disclosed a double-layer capacitor having electrodes formed of a current collector positioned against a non-woven web of non-activated carbon fibers impregnated with carbon particles and positioned on either side of a porous layer within a container including a suitable electrolyte and having a conductor connected to each current collector of each electrode wherein the carbon fibers are of a surface area of less than 100 $m^2/g$, preferably less than 5 $m^2/g$.

6 Claims, 1 Drawing Sheet

PROCESS FOR MANUFACTURING SUPER CAPACITOR

This is a division of application Ser. No. 08/065,987, filed May 21, 1993, now abandoned.

BACKGROUND OF THE INVENTION

1. Field of the Invention

This invention relates to an electrical double-layer capacitor and more particularly to an improved electrical double-layer supercapacitor and process for manufacturing same.

2. Description of the Prior Art

An electrolytic double-layer capacitor is comprised of a separator layer positioned between polarizable electrodes enclosed in a container including an electrolyte whereby when voltage is applied one electrode is negatively charged and the other electrode is positively charged, such as disclosed in U.S. Pat. No. 4,562,511 to Nishino et al. As disclosed therein, each electrode is in contact with a side of the container which is insulated from the other side thereof. A thus charged capacitor may be discharged over a period of time as a power source, and subsequently recharged again and again as a power source. U.S. Pat. Nos. 4,597,028 and 4,626,964 are also illustrative of the prior art. In U.S. Pat. No. 4,626,964 to Azuma et al., there is disclosed a double layer capacitor including paired electrodes comprised of activated carbon fiber fabric impregnated with activated carbon particles. Such capacitors are formed of costly materials of construction to achieve desired large surface areas on the fabric substrates. Additionally, attaching current collectors to the activated carbon fiber fabric requires plasma or flame spraying techniques limiting useful capacitor configurations.

OBJECTS OF THE PRESENT INVENTION

An object of the present invention is to provide an improved double-layered supercapacitor.

Another object of the present invention is to provide an improved double-layered supercapacitor from less costly materials of construction.

Still another object of the present invention is to provide an improved supercapacitor which may be readily manufactured without time consuming critical processing steps.

Yet another object of the present invention is to provide an improved process for manufacturing supercapacitors of bipolar configurations.

A still further object of the present invention is to provide suercapacitors of large surface areas.

SUMMARY OF THE PRESENT INVENTION

These and other objects of the present invention are achieved by a double-layer capacitor having electrodes formed of a current collector positioned against a nonwoven web of non-activated carbon fibers impregnated with carbon particles and positioned on either side of a porous layer within a container including a suitable electrolyte and having a conductor connected to each current collector of each electrode wherein the carbon fibers are of surfaces area of less than 100 $m^2/g$, preferably less than 5 $m^2/g$.

BRIEF DESCRIPTION OF THE DRAWINGS

Other features and advantages of the present invention will become more readily apparent from the following detailed description when taken with the accompanying drawing of a schematic elevational view of a double-layer capacitor illustrating a preferred embodiment of the present invention.

DETAIL DESCRIPTION OF THE PRESENT INVENTION

Figure 1:
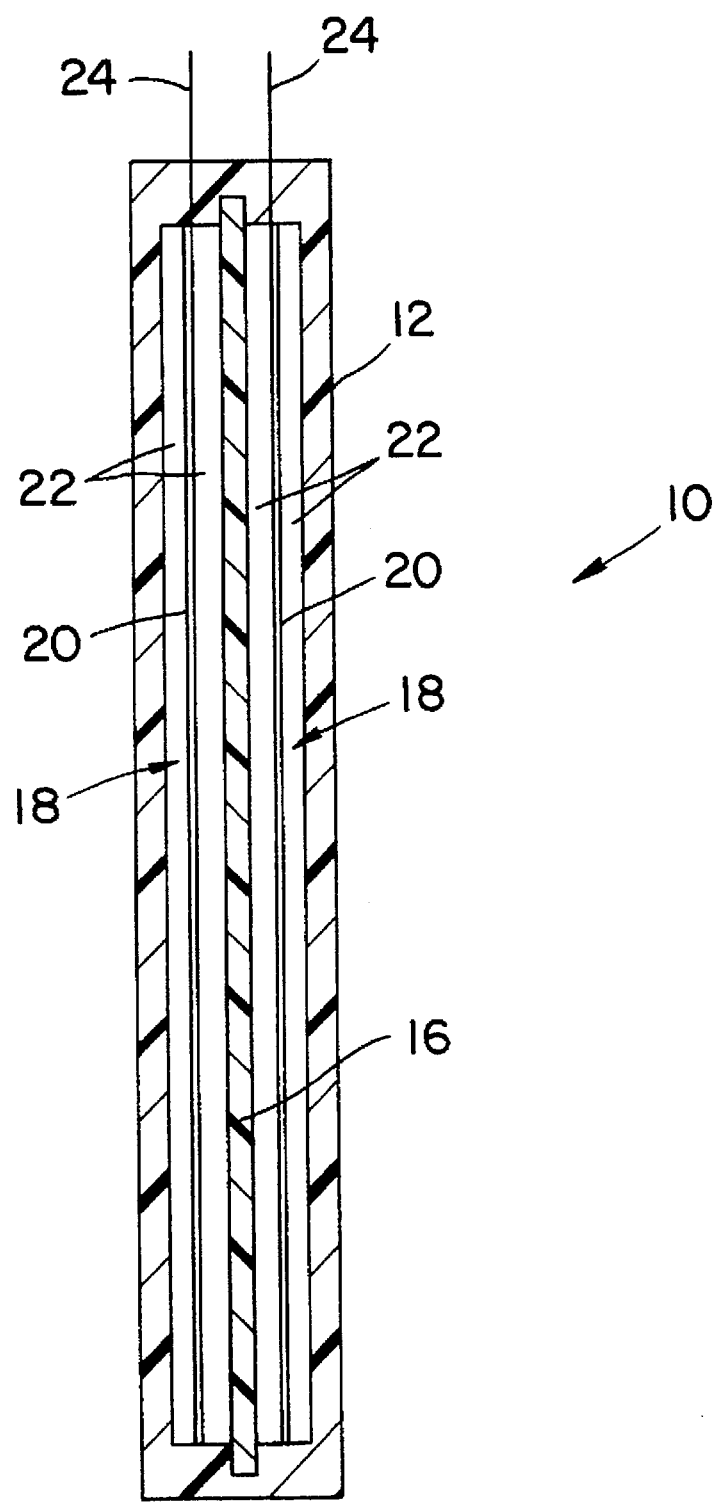

Referring now to the drawing, there is illustrated a double-layer capacitor, generally indicated as 10, comprised of a housing member 12 defining a chamber 14 in which is positioned a separator member 16 disposed between electrode members, generally indicated as 18 and an electrolyte (non shown). Each electrode member 18 is a laminated structure comprised of a metal substrate 20 and reactive layers 22 laminated to the metal substrate 20, such as disclosed in U.S. Pat. No. 4,906,535 to Hoge. The metal substrate 20 may be as metal mesh or foil and is connected to a conductor 24 to be attached to electrical elements as understood by one skilled in the art.

The metal substrate 20 is a current collector formed of a suitable metallic material, such as nickel, stainless steel and the like, formed for example by expanded metal techniques. Choice of the metallic material is a function of the electrolyte to be used, as more fully hereinafter discussed.

The reactive layer 22 is comprised of a nonwoven web of non-activated carbon fibers impregnated with a mixture of carbon particles and a nonfibrous polymeric substance for holding the carbon particles in the web. The non-activated carbon fibers are of a length of from about 0.5 to 1.25 inches and a diameter of from about 5.0 to 15.0 u. The carbon fibers are of a surface area of less than 100 $m^2/g$, preferably less that 5 $m^2/g$. The carbon content of such carbon fibers is preferably at least about 90 weight percent exhibiting as resistance of less than about 20 $ohms/cm^2$.

The nonwoven web of carbon fibers is formed into a thickness of from 5 to 50 mils exhibiting a pore volume of at least about 90 percent, to provide a high pick-up of the impregnation mixture whether in suspension or in a coating format. The impregnation mixture should increase the basic weight of the fibrous web of carbon fiber by about 20 to 200 $g/m^2$ as a function of solids content of the impregnation suspension or coating and pore volume of the fibrous web, and provide a front-to-back (F/B) electrical conductivity of less than about 1 ohm.

The impregnation mixture, in the form of a suspension or coating, is comprised of carbon particles, generally in the form of carbon black, a nonfibrous polymeric material to bind the carbon particles to the web and a dispersion or mixing agents. The carbon particles are sized, expressed as surface area ($m^2/g$), generally in excess of 1000, and preferably greater than about 1250, such as Black Pearls 2000, available from Cabot Corporation having a mean particle diameter of 0.015 u.

The nonfibrous polymeric materials include the polytetrafluoroethylenes, such as Teflon$^O$ T-30, a registered trademark of dupont. The dispersion or mixing agents include the sodium salt of polymeric naphthalene sulfonic acid and those included with the polytetrafluoroethylene (PTFE).

The nonwoven web of carbon fiber is impregnated by immersion, coating extrusion or the like, with the aqueous suspension of the impregnation mixture of the carbon particles, nonfibrous polymeric substance and other desired nonfibrous ingredients. The impregnated conductive nonwoven web is preferably dried at a temperature of from about 150° to 400° F., (a temperature below the sintering temperature of the binder material, i.e. the PTFE) and a temperature high enough to ensure substantially complete moisture removal.

An electrode member 18 is positioned on either side of a porous separator member 16 within the chamber 14 of the housing 12 and an electrolyte, such as potassium hydroxide (4M) is added to fill the void volume prior to encapsulating the members within the chamber 14. The separator member 16 is formed of dielectric porous material, such as a sheet of hydrophillic polypropylene (Celgard, a registered trademark of Hoescht-Celanese).

The electrolyte may be any suitable electrolyte for use in the generation of electricity in a battery configuration given the metal of the current collector. Potassium hydroxide solutions, may be used with a current collector in the form of nickel whereas sulfuric acid may necessitate the use of lead-based or tantalum-based current collector materials to withstand the corrosive effect of sulfuric acid. Improved conductivity and an increase in voltage are achieved by use of sulfuric acid and lead-based current collector materials of construction- Still higher voltages may be achieved by use of organic-based electrolytes with aluminum-based current collectors.

EXAMPLES OF THE INVENTION

The process of the present invention is set forth in the following specific examples which are intended to be merely illustrative and the present invention is intended not to be limited thereto.

EXAMPLE I

A nonwoven web of carbon fibers (International Paper Company) is introduced into a continuous web machine to effect coating and drying operations. The impregnated mixture (carbon/Teflon$^o$ is comprised of 36 gms. of an aqueous dispersion of Black Pearls 2000 (15% solids ) and 0.9 gms. Teflon) T-30 (60%O solids) applied at a solids content of 12.0%. Impregnation is effected to provide an add-on of 60 GSM. The resulting impregnated layers and fine nickel mesh (Delker) precoated with an adhesive are passed through an over maintained at a temperature of from 200° to 300° F. and thence passed through laminating rolls at a nip pressure of 600 pounds per lineal inch at a temperature of 250° F. to form the electrode substrate.

Sheets of the electrode substrate connected to a conductor are positioned on either side of a slightly larger sheet of porous polypropylene to form a "Swiss roll" which is placed in a container of 9M KOH. The total area of nonwoven is 680 cm$^2$ (i.e. 170 cm$^2$ per contacting surface between current collector and a layer of the nonwoven web) with a working volume below about 20 cm$^3$. The resulting capacitor assembly is repeatedly charged to 1 Volt and discharged to different resistors. The apparent capacitance is 67 Farad at 20 ohm discharge and 81 Farad at 100 ohm discharge. Self discharge is nominal (78% of the charge retained after 60 hrs).

EXAMPLE II

A carbon black dispersion is prepared containing carbon black BP-2000, dispersant and Teflon$^o$ emulsion T30 of total solids content of 14.7% by weight and solids Teflon$^o$ of 20 weight percent on the amount of carbon. A non-woven web of carbon particles as in Example I is impregnated in the dispersion and dried to produce solids deposition by impregnation of ca. 90 g/m$^2$. A nickel metal (M) mesh (Delco) is coated with an adhesive and after drying is laminated with impregnated nonwoven layers (CL) using hot rolling techniques to produce an electrode structure comprised of CL/CL/M/CL/CL. Adherence of the carbon layers is facilitates with solid adhesive powder.

The nickel mesh (M) layer is slightly larger to provide electrical contact. Two of such sheets (13.5 cm×17.5 cm) are positioned on either side of a slightly larger sheet of porous polypropylene and positioned within a plastic container. 4M KOH is added and the container sealed with the nickel contacts extending from the container (Total weight—100 g) to form a supercapacitor which when charged to 1.2 V and discharged at 10A shows a capacitance of about 240 Farads.

While the present invention has been described with reference to a double-layer capacitor, it will be understood that bi-polar configurations are contemplated, e.g. M/CL/SL/CL/M/CL/S/CL/M/wherein S is the porous separation layer.

In accordance with the present invention, it is believed that the surface area of the particulate carbon stores the charge compared to the charging of the nonwoven web of activated carbon fibers of the prior art.

While the invention has been described in connection with an exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed:

1. The process for preparing a supercapacitor, which comprises:

impregnating a nonwoven web of non-activated carbon fibers of a surface area of less than 100 m$^2$/g with a dispersion of carbon particles to form a carbon layer;

positioning said carbon layer against a current collector substrate to form an electrode;

positioning the electrode on either side of a porous separator plate within a container;

adding an electrolyte to said container; and sealing said container.

2. The process as defined in claim 1 and further including the step of forming a carbon layer on either side of said current collector substrate.

3. The process as defined in claim 1 and further including the step of connecting a conductor to said current collecting substrate prior to sealing said container.

4. The process as defined in claim 1 and further including a nonfibrous polymeric material in said dispersion prior to said impregnating step.

5. The process as defined in claim 1 wherein said carbon layer is dried prior to positioning same against said current collector substrate.

6. The process as defined in claim 1 wherein adhesive is applied to said current collector substrate prior to positioing said carbon layer against said current collector substrate.

* * * * *